(12) United States Patent
Szolak et al.

(10) Patent No.: US 11,686,275 B2
(45) Date of Patent: Jun. 27, 2023

(54) METHOD FOR OPERATING A CATALYTIC EVAPORATOR AND USES OF THE METHOD

(71) Applicant: Fraunhofer-Gesellschaft Zur Förderung Der Angewandten Forschung E.V., Munich (DE)

(72) Inventors: Robert Szolak, Freiburg (DE); Alexander Susdorf, Breisach (DE); Florian Rümmele, Freiburg (DE)

(73) Assignee: Fraunhofer-Gesellschaft Zur Forderung Der Angewandten Forschung E.V., Munich (DE)

( * ) Notice: Subject to any disclaimer, the term of this patent is extended or adjusted under 35 U.S.C. 154(b) by 202 days.

(21) Appl. No.: 16/766,802

(22) PCT Filed: Nov. 22, 2018

(86) PCT No.: PCT/EP2018/082191
§ 371 (c)(1),
(2) Date: May 26, 2020

(87) PCT Pub. No.: WO2019/101846
PCT Pub. Date: May 31, 2019

(65) Prior Publication Data
US 2020/0370514 A1 Nov. 26, 2020

(30) Foreign Application Priority Data

Nov. 24, 2017 (DE) ...................... 10 2017 127 847.8
Mar. 23, 2018 (DE) ...................... 10 2018 204 456.2

(51) Int. Cl.
*F02M 21/02* (2006.01)
*F02M 21/06* (2006.01)
(Continued)

(52) U.S. Cl.
CPC ......... *F02M 21/0287* (2013.01); *F01N 3/025* (2013.01); *F01N 3/035* (2013.01);
(Continued)

(58) Field of Classification Search
CPC combination set(s) only.
See application file for complete search history.

(56) References Cited

U.S. PATENT DOCUMENTS 4,121,542 A 10/1978 Frie et al.
6,202,407 B1 3/2001 Brusasco et al.
(Continued)

FOREIGN PATENT DOCUMENTS

DE 102006060669 A1 6/2007
DE 102010012945 A1 9/2011
(Continued)

OTHER PUBLICATIONS

Thomson Scientific, London, GB;, vol. 2004, No. 65, AN 2004-665598, abstract No. 0, Section Ch, Retrieved from: Database WPI [online], XP002788190 & JP2004262689A.
(Continued)

*Primary Examiner* — Binh Q Tran
(74) *Attorney, Agent, or Firm* — Alix, Yale & Ristas, LLP (57) ABSTRACT

A method is described for operating a catalytic evaporator (1), with the step: feeding fuel and an oxidant to the catalytic evaporator, which method is distinguished by the fact that (a) the feed of the fuel is performed as a pulsed feed, and/or (b) the feed of the oxidant is performed as a pulsed feed.

12 Claims, 6 Drawing Sheets

(51) Int. Cl.
  *F02M 31/18* (2006.01)
  *F01N 3/025* (2006.01)
  *F01N 3/035* (2006.01)
  *F01N 3/05* (2006.01)
  *F01N 3/20* (2006.01)

(52) U.S. Cl.
  CPC ............ *F01N 3/05* (2013.01); *F01N 3/2033* (2013.01); *F02M 21/06* (2013.01); *F02M 31/18* (2013.01)

(56) References Cited

U.S. PATENT DOCUMENTS

| | | | |
|---|---|---|---|
| 7,386,977 B2 | 6/2008 | Ancimer et al. | |
| 7,691,160 B2* | 4/2010 | Kirwan | B01J 8/0492 48/197 R |
| 2002/0146604 A1 | 10/2002 | Matoba | |
| 2005/0087437 A1* | 4/2005 | Sakurai | B01J 8/0278 204/172 |
| 2008/0118423 A1* | 5/2008 | Fattic | C01B 3/386 422/168 |
| 2008/0282687 A1* | 11/2008 | Park | F01N 13/009 60/300 |
| 2009/0320455 A1* | 12/2009 | Fresnet | F01N 3/035 60/297 |
| 2010/0324749 A1* | 12/2010 | Iwamoto | F01N 9/00 700/299 |
| 2013/0219866 A1 | 8/2013 | Szolak et al. | |
| 2014/0231027 A1 | 8/2014 | Eigenberger et al. | |
| 2014/0369890 A1* | 12/2014 | Hirabayashi | F01N 3/206 422/119 |

FOREIGN PATENT DOCUMENTS

| | | |
|---|---|---|
| DE | 102010012945 B4 | 8/2013 |
| DE | 102015120106 A1 | 5/2017 |
| EP | 0716225 A1 | 6/1996 |
| EP | 1207133 A2 | 5/2002 |
| JP | 2002087801 A | 3/2002 |
| JP | 2002158027 A | 5/2002 |
| JP | 2004262689 A | 9/2004 |
| WO | 2007042246 A2 | 4/2007 |

OTHER PUBLICATIONS

International Search Report English Translation for International Application No. PCT/EP2018/082191; dated Feb. 7, 2019; 3 pgs.
"NOx storage /reduction catalyst" from the book of Jan Koop "Detailed modeling of Pt-catalyzed pollutant reduction in exhaust gases of modern combustion engines", pp. 15 to 17; Author: Jan Koop; 8 pgs.
Japanese Office Action for Application No. 2020-528195, dated Feb. 27, 2023, 9 pgs.

* cited by examiner

METHOD FOR OPERATING A CATALYTIC EVAPORATOR AND USES OF THE METHOD

BACKGROUND

The invention relates to a method for operating a catalytic evaporator and uses of the method.

It is known to use catalytic evaporators to adjust the fuel properties of an internal combustion engine. WO 2007/042246 A2 describes a method for evaporating and reforming liquid fuels, in which in a first reaction chamber the fuel is evaporated and strongly sub-stoichiometrically oxidized with the supply of air by means of a first catalyst and in a second reaction chamber the evaporated fuel is mixed with supplied air and then reformed, the ratio of the air volume supplied in the first reaction chamber to the air volume supplied in the second reaction chamber being set between 30:70 and 70:30.

DE 10 2010 012 945 B4 discloses a method for evaporating liquid fuels and/or combustibles, in which a liquid fuel and/or combustible is applied to an absorbent material and an oxygen-containing gas mixture or oxygen is introduced by air supply, the oxygen/fuel ratio being sub-stoichiometric. A device can be used for carrying out this method, comprising a) a central, axially and radially air-permeable air supply, b) a catalyst system which is arranged concentrically around the air supply over at least part of the length thereof, c) a buffer zone arranged concentrically around the catalyst system and d) an absorbent material for fuel distribution that is arranged concentrically around the buffer zone, wherein at least one gas-tight sealing element is fitted between the components a) to d).

DE 10 2015 120 106 A1 discloses a method for adjusting the ignition property of a fuel that uses a unit which has at least one distribution zone, at least one oxidation zone and at least one conversion zone. In this method, fuel is distributed in the distribution zone which has a distribution structure, at least part of the fuel is oxidized with at least one oxidant on at least one catalyst on a catalyst support in the oxidation zone, and at least part of the distributed fuel and/or of another supplied fuel is thermally and/or catalytically converted in the conversion zone. The method is characterized in that the ignition property of the fuel is adjusted by the molar ratio of oxygen contained in the oxidant to the oxygen required for the complete oxidation of the available fuel and/or the pressure in the unit and/or the residence time and/or the temperature.

In general, a catalytic evaporator known per se can be used, for example, as a preliminary process for homogeneously mixing fuel and oxidant, e.g. air. At the same time, the fuel properties can be changed in such a way that nitrogen oxides ($NO_x$) and soot emissions are reduced within the engine. The reaction products of reforming reactions (hydrogen ($H_2$) and carbon monoxide (CO)) are particularly effective for shifting the fuel properties. The light-off temperatures of the components, hydrogen and carbon monoxide, on the diesel oxidation catalyst are much lower than those of diesel, so that when an engine is cold started, the exhaust system reaches the operating temperature more quickly.

In addition, the evaporator can also be used for simultaneously heating the exhaust gas after-treatment system.

A change in the fuel properties due to the catalytic evaporation method can be achieved by increasing the operating pressure and increasing the air ratio. The increase in the operating pressure is limited by the supercharging of the internal combustion engine. The increase in the air ratio leads to an increased temperature at the catalyst and therefore cannot be increased arbitrarily.

SUMMARY OF THE INVENTION

Proceeding from the prior art, the object of the invention is thus to provide a method of operating catalytic evaporators, which does not have the disadvantages known from the prior art, in particular with which the fuel properties can be shifted in a favorable manner with respect to the properties of the original fuel.

According to the invention, this object is achieved by a method for operating a catalytic evaporator according to claim 1 and the uses of the method according to claims 10 to 13. Advantageous further developments of the invention can be found in the subclaims.

According to the invention, a method for operating a catalytic evaporator is proposed, comprising the step of: supplying fuel and an oxidant to the catalytic evaporator (1), wherein
(a) the fuel is supplied as a pulsating addition and/or
(b) the oxidant is supplied as a pulsating addition.

In step (a), the corresponding supply of the oxidant can be effected and, in step (b), the corresponding supply of the fuel can be continuous, in particular if these additions are not designed as pulsating additions.

In the method according to the invention, therefore, either the fuel or the oxidant or both together are added in the form of pulses, with pulses being portions limited in time. They can represent a sequence of regularly recurring additions of the same kind. The pulsating addition is here different from a continuous addition in that the pulsating addition contains addition-free pause times. The pulses for fuel additions and/or the pulses for the oxidant additions can be of equal or different length.

In some embodiments, the pulsating addition of fuel (a) allows a first amount of fuel to be added during a first time period and/or a second amount of fuel to be added during a second time period and/or no fuel to be added during a third time period.

In some embodiments the additions can be made by
(i) adding the first amount of fuel during the first time period and no fuel during the third time period, there being no requirement for a second time period; or
(ii) adding the first amount of fuel during the first time period, adding the second amount of fuel during the second time period and adding no fuel during the third period or
(iii) adding the first amount of fuel during the first time period and the second amount of fuel during the second time period, there being no requirement for a third period.

The designations "first", "second" and "third" do not indicate the order of the additions, but are only used to distinguish the additions. The terms "first amount" and "second amount" indicate that these amounts are different from one another.

In some embodiments, with regard to the fuel supply, the above first time period can be from about 10 ms to about 10 s; the above second time period can be from about 10 ms to about 10 s, and the third time period can be from about 10 ms to about 10 s. In other embodiments of the invention, the first and/or the second and/or the third time period can be selected between about 1 second and about 5 seconds.

The pulses can be adjusted according to the respective concrete requirements for the operation of the catalytic evaporator, for example by means of the following parameters: the amount of fuel in the pulse and/or the duration of the pulse and/or the time between two pulses (corresponds to the frequency of the pulses per time). A person skilled in the art can determine by simple experiments how to adjust the pulses of the fuel addition in order to obtain the specific requirements and the optimum results for the operation of the evaporator.

Surprisingly, it was found that by adding fuel to the catalytic evaporator in pulses, the air ratio can be increased without exceeding the maximum temperature of the catalyst. In this way, the pulse addition of the fuel helps to shift the fuel properties compared to the originally used fuel. Above all, the pulsating addition of the fuel shifts the fuel properties in such a way that the proportion of hydrogen and/or carbon monoxide is significantly increased. At the same time, the pulse mode of operation allows faster switching from maximum to minimum output.

The catalytic evaporator, which can be used in the method according to the invention, can provide a homogeneous mixing of fuel and oxidant, for example air, as a preliminary process. A catalytic evaporator, as it can be used in the method according to the invention, can be used in a manner known per se for heating during the exhaust gas after-treatment. With the method according to the invention, the fuel properties can be changed in such a way that nitrogen oxides ($NO_x$) and soot emissions are reduced within the engine. According to the invention, a particularly favorable and effective shift of the fuel properties towards an increase in the amount of reaction products of reforming reactions (hydrogen ($H_2$) and carbon monoxide (CO)) is achieved. Furthermore, in the method according to the invention, the evaporator can also be used advantageously for the simultaneous heating of the exhaust gas after-treatment system. Furthermore, in the method according to the invention, the light-off temperatures of the components, hydrogen and carbon monoxide, on the diesel oxidation catalyst are considerably lower than those of diesel, so that when an engine is cold started, the exhaust gas system reaches operating temperature more quickly.

The method according to the invention has significant cost and power advantages for gas burners that burn fuel oil and for self-ignition internal combustion engines or diesel engines, both inside the engine and in exhaust gas after-treatment systems. In addition, the method according to the invention has significant cost and power advantages when used inside the engine in the case of internal combustion engines with spark ignition.

As described above, the fuel is added in the form of a pulsating addition. When operating a catalytic evaporator according to the prior art, both the fuel and the oxidant are added continuously in predetermined amounts, i.e. the amount of oxidant and fuel added remains constant over time. In the method according to the invention, it has proved to be particularly advantageous that a preset amount of fuel is added over a certain time, followed by a time period in which no fuel is added, i.e. a time period in which the fuel addition is set to the value "zero". The amount of fuel to be added is in the range of the amounts of fuel previously used in the prior art and added to catalytic evaporators known from the prior art.

In alternative (b) of the method according to the invention, a first amount of the oxidant can be added during the pulsating addition of the oxidant during a first time period and/or a second amount of the oxidant during a second time period and no oxidant during a third time period.

In some embodiments, the additions can be made in such a way that (i) the first amount of oxidant is added during the first time period and no oxidant is added during the third time period, there being no requirement for a second time period or (ii) the first amount of oxidant is added during the first time period, the second amount of oxidant is added during the second time period and no oxidant is added during the third time period or (iii) the first amount of oxidant is added during the first time period and the second amount of oxidant is added during the second time period, there being no requirement for a third time period.

The designations "first", "second" and "third" do not indicate the order of the additions, but are only used to distinguish the additions. The terms "first amount" and "second amount" here indicate that these amounts are different from one another.

In some embodiments, the above first time period can be from about 10 ms to about 10 s in alternative (b) concerning the addition of oxidant; the above second time period can be from about 10 ms to about 10 s and the further time period can be from about 10 ms to about 10 s. In other embodiments, the above first time period can be from about 1 s to about 5 s in alternative (b) concerning the addition of oxidant; the above second time period can be from about 1 s to about 5 s and the further time period can be from about 1 s to about 5 s.

The same advantages can be achieved with the pulsating addition of the oxidant as described above in connection with the pulsating addition of the fuel, so that reference is made in full to the above explanations in this respect.

Catalytic evaporators as known per se from the prior art can be used in the method according to the invention. A person skilled in the art also knows how they can be operated in principle.

A particularly favorable catalytic evaporator is described in DE 10 2015 120 106 A1, to which reference is made in full in terms of the design details and operating mode. The device for setting the ignition property of at least one fuel contains at least one fuel inlet and at least one oxidant inlet,
at least one distribution zone for distributing the fuel with at least one distribution structure for the fuel,
at least one oxidation zone for the at least partial oxidation of the fuel, containing at least one catalyst support with at least one catalyst,
at least one conversion zone for the at least partial catalytic and/or thermal conversion of the fuel, and
at least one outlet for fuel with modified ignition property, wherein the oxidant inlet, the catalyst support and the distribution zone are arranged and designed in such a way that heat generated in the oxidation zone can be transferred to a gas or gas mixture flowing into the distribution zone and/or conversion zone.

In some embodiments, the catalytic evaporator used in the method according to the invention can have a catalyst, which can be applied, for example, to a support. The support with the catalyst can be introduced into a reaction vessel in such a way that an intermediate space is formed between the inner surface of the reaction vessel and the catalyst surface.

The mode of operation of the above described catalytic evaporator is described below by way of example. A good mixture formation of the reactants is favorable for the stable and efficient operation of many chemical processes. In particular in oxidation processes, for example combustion, homogeneous mixing reduces emissions and prevents the formation of soot. For this purpose, the liquid fuel can be converted into the gas phase. The mixing advantages have been proven for various uses (burner, particle filter, reformer). The linkage with an engine is particularly significant. The aim is to adapt the evaporator to the use inside the engine and to verify the reduction of nitrogen oxide and soot emissions on an engine test stand.

When operating a catalytic evaporator, for example, the liquid fuel can be added to the inside of the reactor wall of a catalytic evaporator, while air is added on the catalyst side. A small portion of the fuel oxidizes on the catalyst and the heat generated is used to completely evaporate the fuel. The heat is predominantly transferred by heat radiation from the hot catalyst surface to the surface of the fuel film. The reactor wall onto which the fuel is fed is always colder than the fuel itself. Therefore, no deposits or incrustations are formed.

A fuel is a chemical substance the stored energy of which can be converted into usable energy by combustion. An example of this is fuels that are converted into motive force in internal combustion engines. In some embodiments, the fuel can be selected from gasoline, diesel, bio-oils, pyrolysis oils, biodiesel, heavy fuel oil, alcohols, Fischer-Tropsch fuels, dimethyl ether, diethyl ether, oxymethylene ether, esters, aldehydes, aromatic compounds, amines, carboxylic acids, alkanes, natural gas, camping gas, LPG, flare gases, landfill gases, biogases and mixtures of at least two of these fuels. In particular, liquid fuels can be used in the method according to the invention. With these fuels the above described advantages are achieved in a particularly favorable way.

In some embodiments, the oxidant can contain oxygen or media that contain oxygen, in particular air or exhaust gases with residual oxygen. Thus, the above described advantages are achieved in a particularly favorable way.

Advantageously, as already explained above, the fuel properties are shifted in a favorable way. Therefore, the method according to the invention is best suited to shift the fuel properties in such a way that emissions are reduced. Furthermore, the method according to the invention can be used for evaporators to reduce the light-off temperature in exhaust gas after-treatment systems of internal combustion engines, in particular in diesel engines of passenger cars. Moreover, the method according to the invention is suitable for generating a reducing agent for storage catalysts. This can be done in accordance with U.S. Pat. No. 7,386,977 B2. In this patent publication CO and $H_2$ are generated from methane for regeneration. With the present invention, CO and $H_2$ can be generated from diesel in a manner analogous to U.S. Pat. No. 7,386,977 B2.

BRIEF DESCRIPTION OF THE DRAWINGS

The invention will be explained in more detail below by means of drawings without limitation of the general concept of the invention, wherein.

Figure 1:
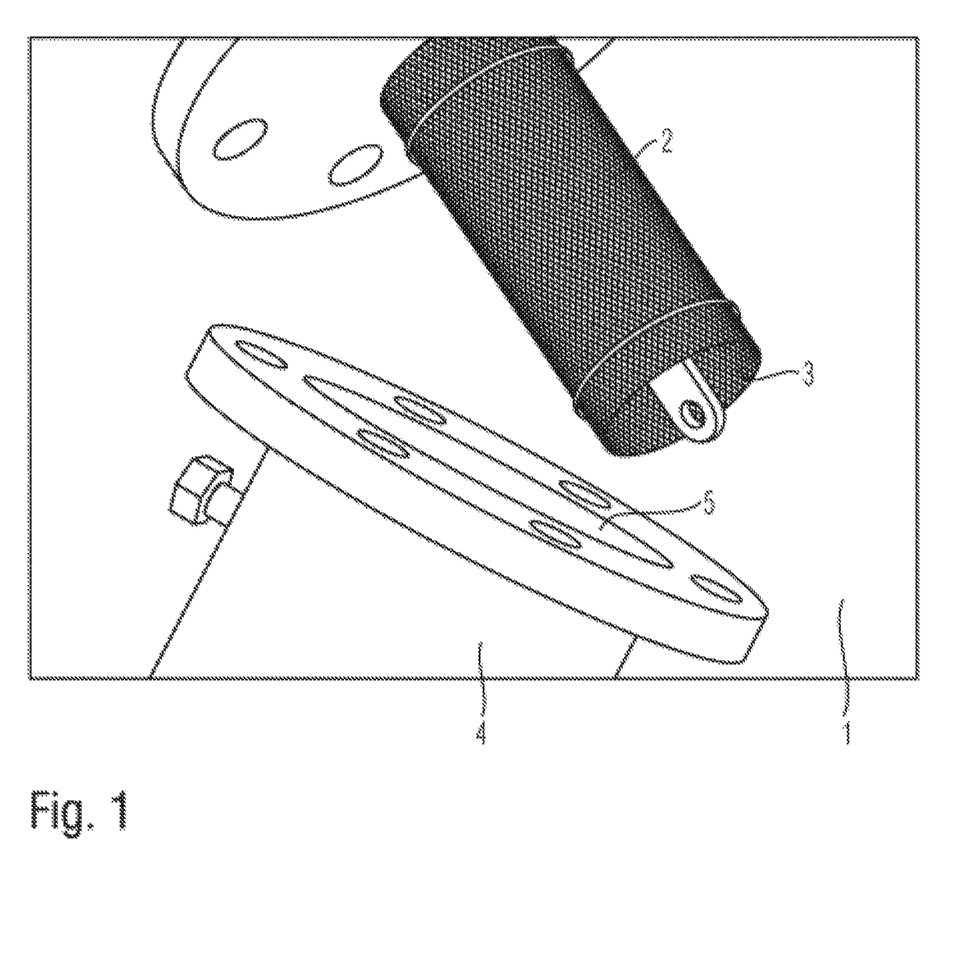
FIG. 1 shows a view of a catalytic evaporator which can be used as an example.

FIG. 1 shows a catalytic evaporator 1 as it can be used in the method according to the invention. The catalytic evaporator has a catalyst 2, which is applied to a metal mesh 3. Catalyst 2 and metal mesh 3 can be made of materials known from the prior art. The metal mesh 3 with the catalyst 2 can be present in a reaction vessel 4. For the sake of clarity, FIG. 1 shows the catalyst 2 with the metal mesh 3 pulled out of reaction vessel 4. If the catalyst 2 with the metal mesh 3 is inserted into the reaction vessel, an intermediate space is formed between the inner surface 5 of the reaction vessel 4 and the surface of the catalyst 2 on the metal mesh 3.

Figure 2:
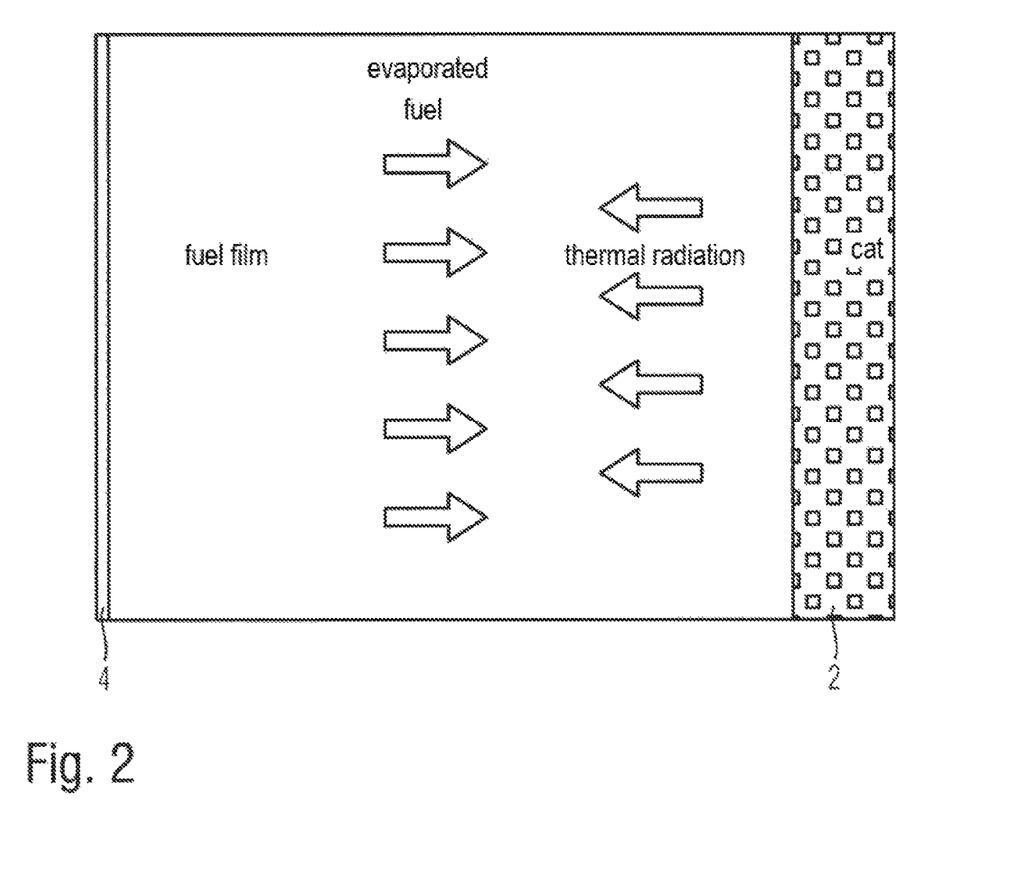
FIG. 2 shows the principle of a mode of action of the catalytic evaporator of FIG. 1.

FIG. 2 shows schematically the mode of action of the catalytic evaporator illustrated in FIG. 1. A good mixture formation of the reactant is favorable for the stable and efficient operation of many chemical processes. In particular in oxidation processes, e.g. combustion, homogeneous mixing reduces emissions and prevents the soot formation. During the operation of the catalytic evaporator, liquid fuels are converted into the gas phase. The mixing advantages have been proven for various applications (burner, particle filter, reformer). The linkage with an engine is particularly significant. The evaporator can be adapted to the internal engine use and the reduction of nitrogen oxide and soot emissions was proven on an engine test stand.

The liquid fuel is added to the inner surface of the reactor vessel 4, while air is added on the catalyst side. A small portion of the fuel oxidizes on the catalyst 2 and the heat generated in this process is used to completely evaporate the fuel. The heat is transferred mainly by heat radiation from the hot surface of the catalyst 2 to the surface of the fuel film. The wall of the reaction vessel 4, onto which the fuel is applied, can here be colder than the fuel itself. Thus, no deposits or incrustations are formed.

Figure 3A:
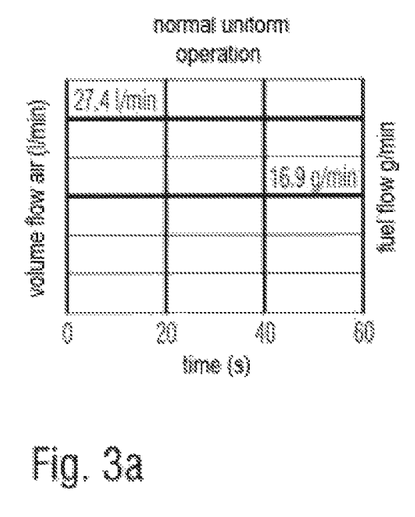
FIGS. 3a to 3e show a comparison of the continuous mode of action and various pulsating modes of operation of a catalytic evaporator according to the invention, in which the fuel is added in a pulsating manner.
Figure 3B:
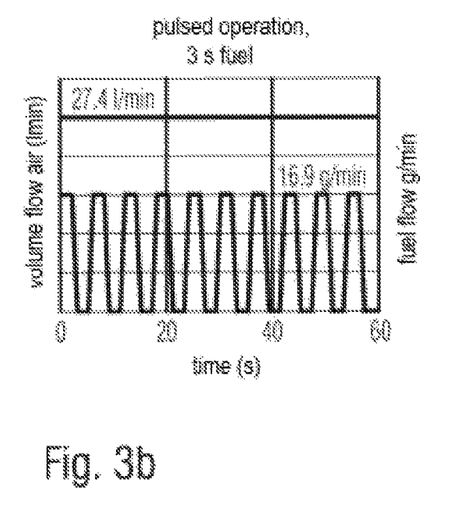

FIGS. 3a and 3b show the curves of the amounts of oxidant added (here: air) and the amounts of fuel. In the normal (i.e. continuous) mode of operation shown in FIG. 3a, the oxidant and the fuel are added continuously in constant amounts over the operating period. In contrast thereto (cf. FIG. 3b), the addition of the fuel is carried out as a pulsating addition in the method according to the invention. The addition of the oxidant, on the other hand, is not carried out as a pulsating addition, but rather as known from the prior art in the form of a continuous addition. In the case of the pulsating addition of the fuel, time periods with an addition of fuel (in the example 16.9 g/min) are followed by time periods without fuel supply (0 g/min). In the example on which FIG. 3b is based, the time periods with and without fuel supply are set to 3 seconds each.

Figure 3C:
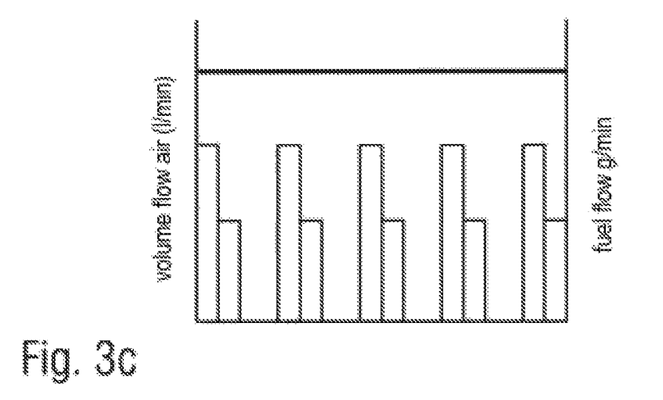
Figure 3D:
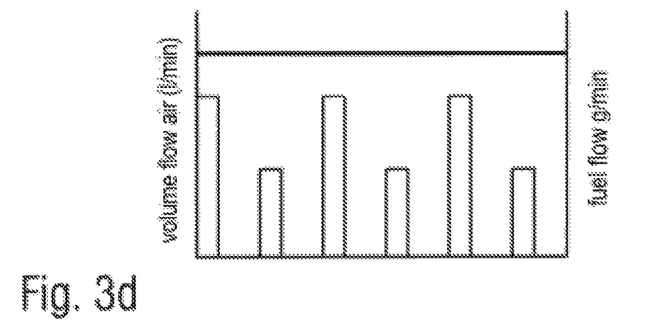
Figure 3E:
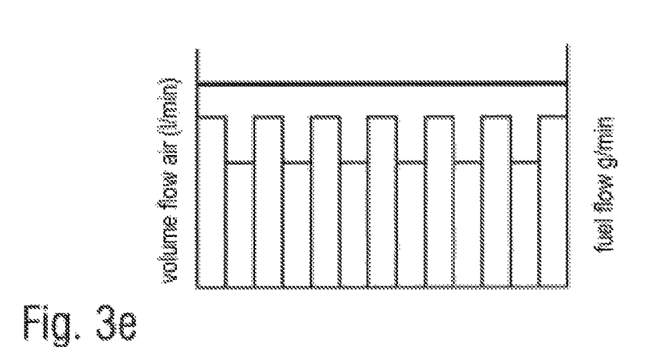
Figure 4A:
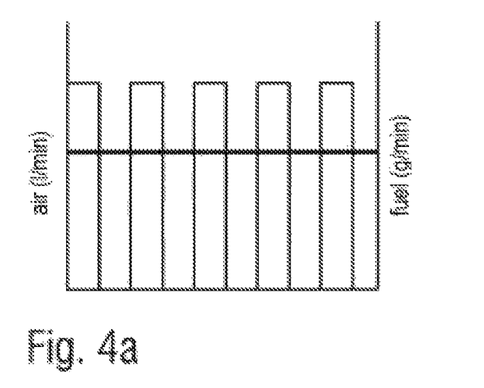
FIGS. 4a to 4d show various pulsating additions of oxidant.
Figure 4B:
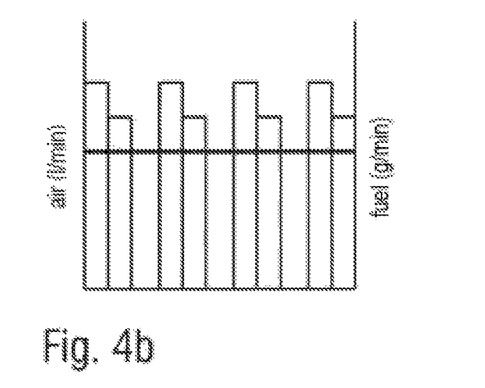
Figure 4C:
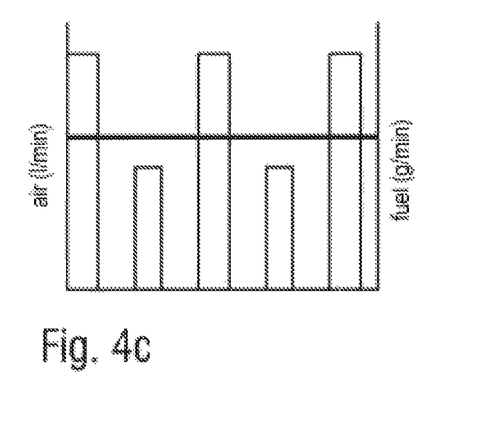
Figure 4D:
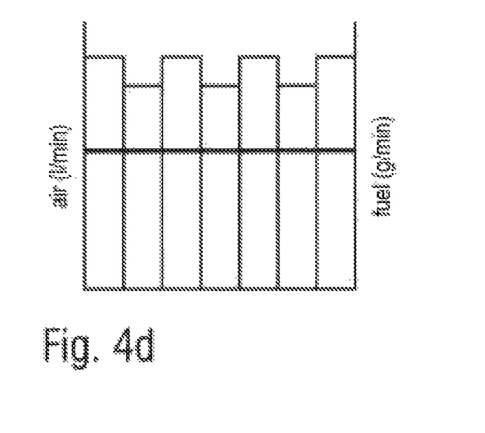
Figures 5A, 5B:
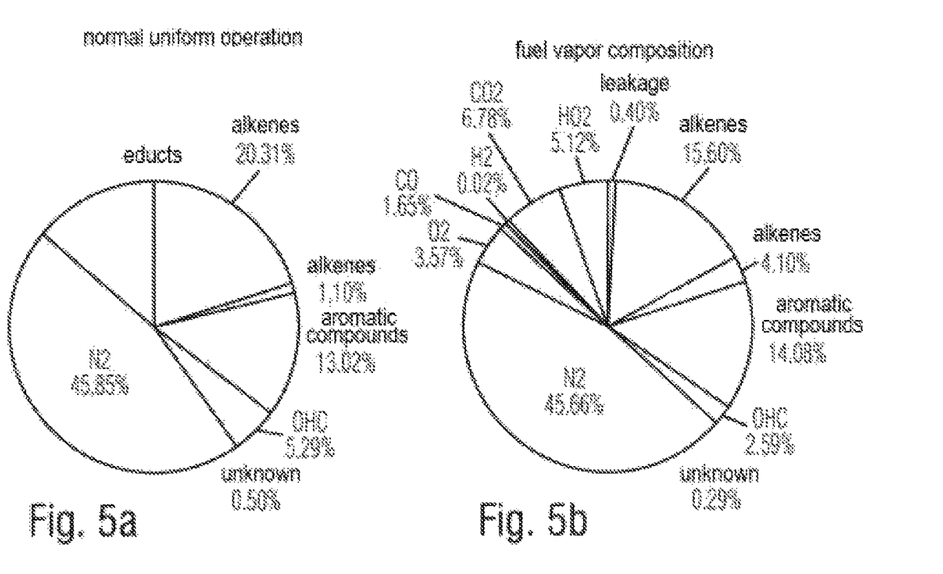
FIGS. 5a-d show the fuel compositions as obtained according to the operating modes in FIGS. 3a and 3b.
Figure 5C:
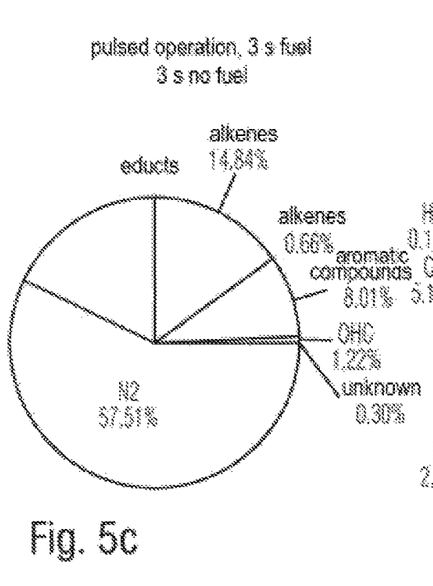
Figure 5D:
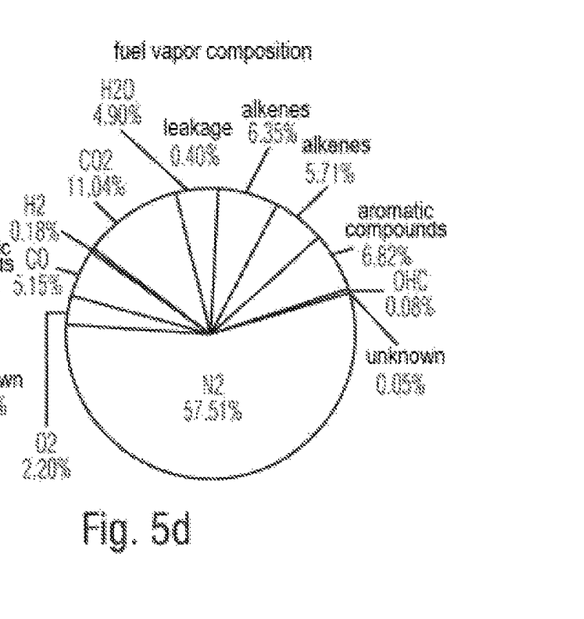

FIGS. 3c to 3e show further embodiments of the pulsating addition of fuel. In FIG. 3b, a first amount of fuel is added in a first time period, immediately followed by a second time period in which a smaller second amount of fuel is added. This is followed by another time period in which no fuel is introduced into the catalytic evaporator.

FIG. 3d shows the pulsating additions of two different amounts of fuel and a time period of no fuel addition, as shown in FIG. 3c, with a time period of no fuel addition between each fuel addition.

FIG. 3e shows the pulsating addition of two different amounts of fuel, with no time period without fuel being added.

FIGS. 4a to 4d show the corresponding pulsating additions of oxidant with continuous addition of fuel, which additions correspond to FIGS. 3b to 3e, so that full reference is made to the above explanations which also apply to FIGS. 4a to 4d with regard to the result.

FIGS. 5a to 5d compare the changes in the fuel composition during normal operation (FIGS. 5a and 5b) shown in FIG. 3a and the pulsating operation (FIGS. 5c and 5d) according to the invention, which is shown in figure 3b. Since the fuel is not continuously supplied in the method according to the invention, an air ratio higher than 0.2 can be run without overheating the catalyst. These high air ratios markedly increase the proportion of carbon monoxide (CO) and hydrogen ($H_2$). It was thus possible to increase the CO proportion by a factor of three and the $H_2$ proportion even by a factor of nine. Adapting the operating mode of a catalytic evaporator allows it to be used in dynamic applications, for example in a car engine.

Of course, the invention is not limited to the embodiments illustrated in the drawings. Therefore, the above description should not be regarded as restrictive but as explanatory. The following claims are to be understood in such a way that a stated feature is present in at least one embodiment of the invention. This does not exclude the presence of further features. If the description or the claims define "first" and "second" features, this designation is used to distinguish between two similar features without determining a ranking order.

The invention claimed is:

1. A method for operating a catalytic evaporator (1) comprising the step of:
   supplying fuel and an oxidant to the catalytic evaporator (1),
   wherein
   (a) the fuel is supplied as a pulsating addition and,
   (b) the oxidant is supplied as a pulsating addition including a first amount of the oxidant added during a first time period or a second amount of the oxidant added during a second time period or no oxidant added during a third time period.

2. The method of claim 1, wherein in the pulsating addition of the fuel a first amount of the fuel is added during a first time period or a second amount of the fuel is added during a second time period or no fuel is added during a third time period.

3. The method of claim 2, wherein
   (i) the first amount of fuel is added during the first time period and no fuel is added during the third time period, or
   (ii) the first amount of fuel is added during the first time period, the second amount of fuel is added during the second time period and no fuel is added during the third time period, or
   (iii) the first amount of fuel is added during the first time period and the second amount of fuel is added during the second time period.

4. The method of claim 2, wherein the first time period is 10 ms to 10 s or the second time period is 10 ms to 10 s or the third time period is 10 ms to 10 s.

5. The method of claim 1, wherein
   (i) the first amount of oxidant is added during the first time period and no oxidant is added during the third time period, or
   (ii) the first amount of oxidant is added during the first time period, the second amount of oxidant is added during the second time period and no oxidant is added during the third time period, or
   (iii) the first amount of oxidant is added during the first time period and the second amount of oxidant is added during the second time period.

6. The method of claim 1, wherein the first time period is 10 ms to 10 s or the second time period is 10 ms to 10 s or the third time period is 10 ms to 10 s.

7. The method of claim 1, wherein the fuel is selected from gasoline, diesel, bio-oils, pyrolysis oils, biodiesel, heavy fuel oil, alcohols, Fischer-Tropsch fuels, dimethyl ether, diethyl ethers oxymethylene ether, esters, aldehydes, aromatic compounds, amines, carboxylic acids, alkanes, natural gas, camping gas, LPG, flare gases, landfill gases, bio-gases and mixtures of at least two of these fuels.

8. The method of claim 1, wherein the oxidant contains oxygen or oxygen-containing media, in particular air or exhaust gases with residual oxygen.

9. The method of claim 1, wherein said method shifts properties of said fuel in such a way that emissions are reduced within the engine.

10. The method of claim 1, wherein said method reduces the light-off temperature in exhaust gas after-treatment systems of internal combustion engines.

11. The method of claim 1, wherein said method generates a reducing agent for storage catalysts.

12. The method of claim 1, wherein the first time period is 1 s to 5 s or the second time period is 1 s to 5 s or the third time period is 1 s to 5 s.

* * * * *